US010029321B1

(12) United States Patent
McCarthy

(10) Patent No.: US 10,029,321 B1
(45) Date of Patent: Jul. 24, 2018

(54) REPETITIVE ROTARY BROACHING

(71) Applicant: Triangle Manufacturing Company, Inc., Upper Saddle River, NJ (US)

(72) Inventor: Brian E. McCarthy, Coon Rapids, MN (US)

(73) Assignee: Triangle Manufacturing Company, Inc., Upper Saddle River, NJ (US)

( * ) Notice: Subject to any disclaimer, the term of this patent is extended or adjusted under 35 U.S.C. 154(b) by 228 days.

(21) Appl. No.: 15/082,200

(22) Filed: Mar. 28, 2016

(51) Int. Cl.
*B23D 37/00* (2006.01)
*B23D 13/00* (2006.01)

(52) U.S. Cl.
CPC ............ *B23D 37/005* (2013.01); *B23D 13/00* (2013.01); *B23D 37/00* (2013.01); *Y10T 409/4077* (2015.01); *Y10T 409/40385* (2015.01); *Y10T 409/403675* (2015.01)

(58) Field of Classification Search
CPC ........ B23D 37/02; B23D 37/00; B23D 13/00; B23D 13/02; Y10T 409/40385; Y10T 409/403675; Y10T 409/4077; Y10T 409/4028; Y10T 409/501476; Y10T 409/501804; Y10T 409/502624; Y10T 409/509348
See application file for complete search history.

(56) References Cited

U.S. PATENT DOCUMENTS

| 1,528,800 | A | 3/1925 | Thannhauser | |
|---|---|---|---|---|
| 2,106,212 | A | 1/1938 | Halborg | |
| 2,372,823 | A | 4/1945 | Gotberg | |
| 2,387,582 | A * | 10/1945 | Helming | B23D 37/00 29/38 F |
| 2,654,293 | A | 10/1953 | Coles | |
| 3,741,573 | A | 6/1973 | Treer | |
| 3,858,482 | A * | 1/1975 | Scaduto | A23C 19/061 279/20 |
| 3,978,765 | A * | 9/1976 | Scaduto | B23C 3/26 279/20 |
| 4,141,278 | A | 2/1979 | Lieser | |
| 4,648,295 | A | 3/1987 | Ley et al. | |
| 4,859,125 | A | 8/1989 | Lubiarz | |
| 5,615,467 | A * | 4/1997 | Simmons | B23D 37/04 29/27 C |
| 6,761,096 | B1 | 7/2004 | Kochsick | |
| 7,422,398 | B2 | 9/2008 | Wirtanen et al. | |
| 2014/0202299 | A1 | 7/2014 | Frenken | |

FOREIGN PATENT DOCUMENTS

CH       451647 A  *  5/1968  ............. B23D 37/00

* cited by examiner

*Primary Examiner* — Ryan Rufo
(74) *Attorney, Agent, or Firm* — Arthur Jacob

(57) ABSTRACT

A broaching tool is held during the conduct of repetitive duplicate rotary broaching operations on serially presented workpieces. The broaching tool is engaged serially with each workpiece for rotation with the engaged workpiece during a corresponding rotary broaching operation. Each workpiece has a given configuration and the broaching tool has a prescribed configuration placed at an initial orientation for establishing a broached configuration placed at a same predetermined orientation relative to the given configuration of each workpiece. Upon completion of a rotary broaching operation on a workpiece, the broaching tool is returned to the initial orientation of the prescribed configuration in preparation for a duplicate rotary broaching operation on a subsequent serially presented workpiece.

10 Claims, 5 Drawing Sheets

REPETITIVE ROTARY BROACHING

The present invention relates generally to rotary broaching and pertains, more specifically, to the conduct of repetitive, duplicate rotary broaching operations on serially presented workpieces where a broaching tool of prescribed configuration is engaged with serially presented workpieces, each workpiece having a given configuration, for establishing a broached configuration placed at a same predetermined orientation relative to the given configuration of each workpiece.

Rotary broaching commonly is utilized to create axis-symmetric features relative to the centerline of a part being turned in a lathe, a screw machine, a milling machine or a similar metal cutting apparatus. A rotary broach functions by engaging a rotating workpiece with a profiled broaching tool in the form of a broach of prescribed configuration held at a slight off-axis angle, typically 1° to 1.5°, relative to the rotating workpiece. The contact between the broach and the rotating workpiece causes rotation of the broach, while the off-axis angle causes the broach to wobble with respect to the engaged workpiece so that the cutting edge of the broach is engaged with only a small section of the workpiece. When this engagement of the broach with the workpiece is combined with enough force, the broach will cut the prescribed configuration into the workpiece. Rotary broaching has been found to be ideal for generating, for example, square, hexagonal, TORX® and various gear profiles into a workpiece.

In general, rotary broaching operations require two basic components, namely, a tool holder and the broach itself. The broach is constructed of a metal tough enough and sharp enough to cut into a particular workpiece and will have the desired profile configuration, at a leading edge, commensurate with the configuration of the feature to be created in the workpiece. In addition, a required clearance between the workpiece and the broach is provided by a suitable draft angle. The tool holder is configured to hold the broach at an angle to the workpiece, usually 1° to 1.5°, which angle produces a rotating cutting edge placed against the workpiece to create the desired feature. The broach is advanced under pressure, moving a fixed distance with each rotation, until the desired feature is cut into the workpiece. The speed and repeatability of such rotary broaching renders the process ideal for many applications.

Because the broach must rotate with the workpiece during a rotary broaching operation, the tool holder is mounted for rotation, usually by means of a bearing arrangement, to enable free spinning of the tool holder and the broach for allowing the broach to rotate with the workpiece in response to engagement of the broach with the workpiece. Thus, as the workpiece is engaged by the broach at the commencement of a broaching operation, the orientation of the profile configuration of the broach relative to the workpiece is random, with the result that the orientation of the feature created by the broaching operation will itself be random with respect to any particular structural feature of the workpiece. Hence, in order to arrange for a desired relative orientation between the feature created by the broaching operation and a particular structural feature of the workpiece, and especially during the production of a number of serially presented workpieces, secondary machining operations are required on each workpiece subsequent to the broaching operation, resulting in increased manufacturing complexity and concomitant increased costs.

The present invention eliminates the above-outlined problem by assuring that the broaching tool, once placed in the desired orientation relative to the configuration of a workpiece upon which a broaching operation is to be performed, is returned automatically to that original desired orientation upon completion of the broaching operation, in preparation for a subsequent repetitive broaching operation to be conducted on a next-consecutive workpiece presented for broaching. As such, the present invention attains several objects and advantages, some of which are summarized as follows: Enables the conduct of repetitive rotary broaching operations on serially presented workpieces where a broached configuration is to be oriented at a desired orientation relative to a particular structural feature of each serially presented workpiece; eliminates the requirement for secondary machining operations in order to assure a desired orientation of a broached configuration relative to a structural feature of a workpiece in repetitive rotary broaching operations conducted on serially presented workpieces; assures accuracy in the conduct of repetitive duplicate rotary broaching operations on serially presented workpieces; facilitates the production of completed parts in which a broached feature is created by rotary broaching conducted on each one of serially presented workpieces, with the broached feature oriented in a desired orientation relative to an existing structural feature of the serially presented workpieces; enables reliable, repetitive rotary broaching operations for increased economy in the production of completed parts of consistent high quality; provides apparatus and method capable of effective performance in the conduct of rotary broaching throughout an extended service life.

The above objects and advantages, as well as further objects and advantages, are attained by the present invention which may be described briefly as apparatus for holding a broaching tool during the conduct of repetitive duplicate rotary broaching operations on serially presented workpieces wherein the broaching tool is engaged serially with each workpiece for rotation with the engaged workpiece during a corresponding rotary broaching operation, each workpiece having a given configuration and the broaching tool having a prescribed configuration placed at an initial orientation for establishing a broached configuration placed at a same predetermined orientation relative to the given configuration of each workpiece, the apparatus being constructed such that upon completion of a rotary broaching operation on a workpiece, the broaching tool is returned to the initial orientation of the prescribed configuration in preparation for a duplicate rotary broaching operation on a subsequent serially presented workpiece, the apparatus comprising: a support assembly; a tool holder mounted upon the support assembly for rotation relative to the support assembly about an axis of rotation, and for translation along the axis of rotation between a first axial position and a second axial position relative to the support assembly; a reference construct carried by the support assembly at a fixed position corresponding to the initial orientation of the prescribed configuration of the broaching tool; an orienting construct coupled with the tool holder for rotation with the tool holder in response to engagement with the reference member; a biasing construct for biasing the orienting construct and the reference construct into engagement with one another, with a biasing force for biasing the orienting construct and the tool holder into a broaching position corresponding to the initial orientation of the prescribed configuration of the broaching tool, such that upon engagement of a broaching tool held within the tool holder with a workpiece and movement of the tool holder from the first axial position to the second axial position, against the biasing force, the tool holder, and the broaching tool held therein, will be free to rotate about the axis of rotation, in response to rotation of the engaged workpiece, and upon disengagement of the broaching tool from the workpiece, the tool holder will be moved, in response to the biasing force, from the second axial position to the first axial position, whereby the orienting construct and the reference construct will be engaged with one another to return the tool holder and the broaching tool to the broaching position in preparation for a duplicate rotary broaching operation on a subsequent serially presented workpiece.

In addition, the present invention provides a method for holding a broaching tool during the conduct of repetitive duplicate rotary broaching operations on serially presented workpieces wherein the broaching tool is engaged serially with each workpiece for rotation with the engaged workpiece during a corresponding rotary broaching operation, each workpiece having a given configuration and the broaching tool having a prescribed configuration placed at an initial orientation for establishing a broached configuration placed at a same predetermined orientation relative to the given configuration of each workpiece, the method being such that upon completion of a rotary broaching operation on a workpiece, the broaching tool is returned to the initial orientation of the prescribed configuration in preparation for a duplicate rotary broaching operation on a subsequent serially presented workpiece, the method comprising: providing a support assembly; mounting a tool holder upon the support assembly for rotation relative to the support assembly about an axis of rotation, and for translation along the axis of rotation between a first axial position and a second axial position relative to the support assembly; providing a reference construct carried by the support assembly at a fixed position corresponding to the initial orientation of the prescribed configuration of the broaching tool; coupling an orienting construct with the tool holder for rotation with the tool holder in response to engagement with the reference member; biasing the orienting construct and the reference construct into engagement with one another, with a biasing force for biasing the orienting construct and the tool holder into a broaching position corresponding to the initial orientation of the prescribed configuration of the broaching tool, such that upon engagement of a broaching tool held within the tool holder with a workpiece and movement of the tool holder from the first axial position to the second axial position, against the biasing force, the tool holder, and the broaching tool held therein, is free to rotate about the axis of rotation, in response to rotation of the engaged workpiece, and upon disengagement of the broaching tool from the workpiece, the tool holder is moved, in response to the biasing force, from the second axial position to the first axial position, to engage the orienting construct and the reference construct with one another so as to return the tool holder and the broaching tool to the broaching position in preparation for a duplicate rotary broaching operation on a subsequent serially presented workpiece.

The present invention will be understood more fully, while still further objects and advantages will be made apparent, in the following detailed description of preferred embodiments of the invention illustrated in the accompanying drawing, in which.

Figure 1:
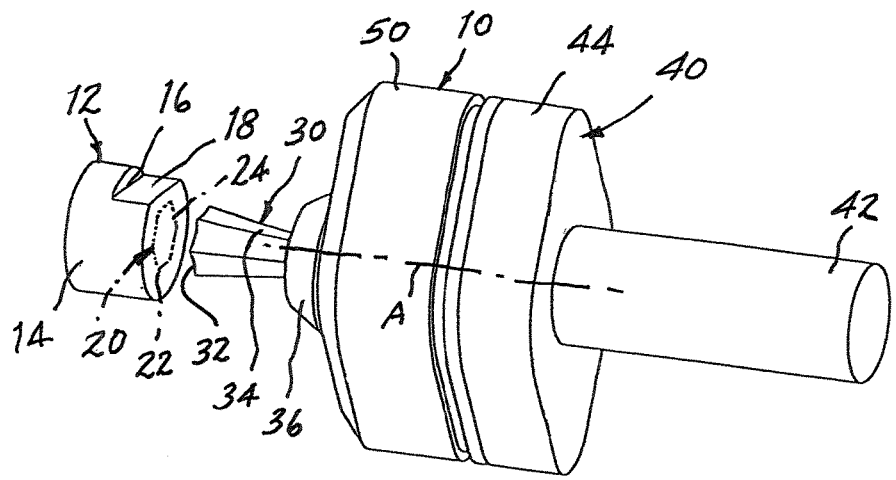
FIG. 1 is a somewhat diagrammatic pictorial view of an apparatus constructed in accordance with the present invention, showing a step in the conduct of a rotary broaching operation in accordance with the present invention.
Figure 2:
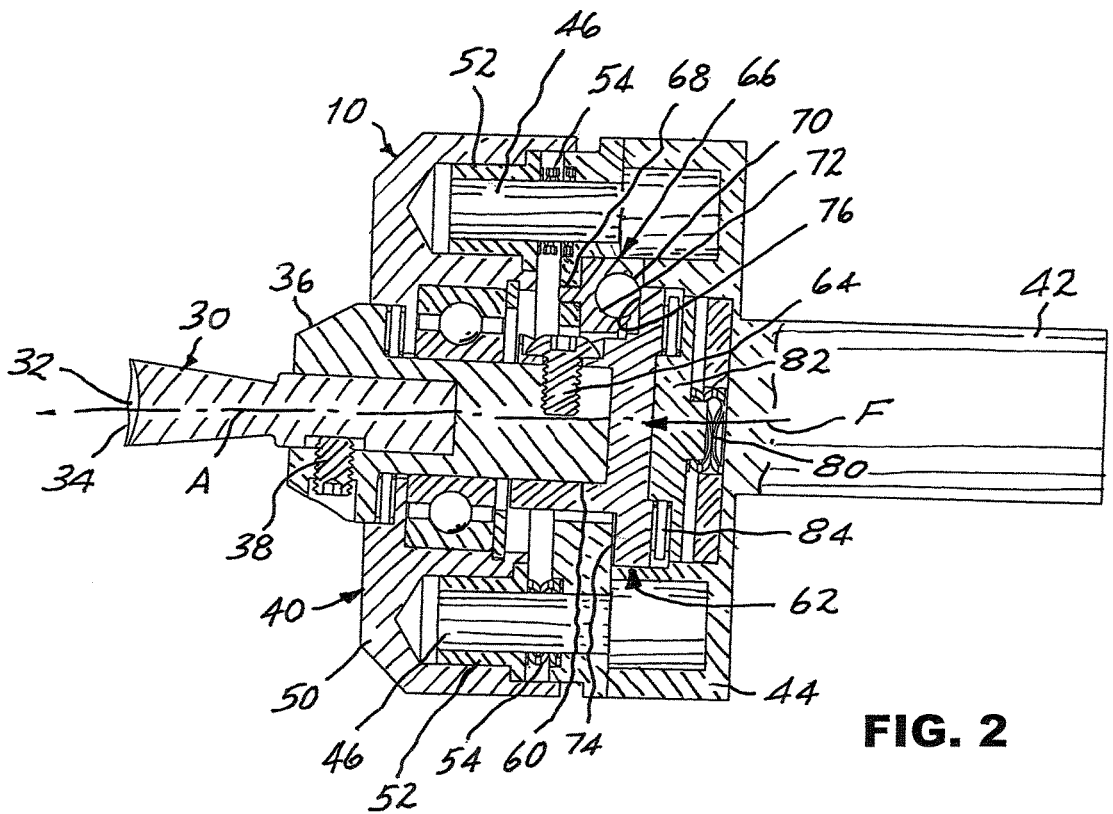
FIG. 2 is an enlarged longitudinal cross-sectional view of the apparatus as shown in FIG. 1.

Referring now to the drawing, and especially to FIGS. 1 and 2 thereof, an apparatus constructed in accordance with the present invention is shown at 10 and is seen to be in preparation for the conduct of a rotary broaching operation to be performed on a workpiece 12 in accordance with the present invention. Workpiece 12 is in the form of a generally cylindrical part 14 that includes a structural feature shown in the form of a notch 16 having a flat 18 extending along the peripheral surface of the part 14. Workpiece 12 is to be presented to apparatus 10 for the conduct of a rotary broaching operation to create a recess, as illustrated in phantom at 20, in the member 14. Recess 20 is to have a cross-sectional configuration in the form of a hexagon 22 having six sides 24, and is to be oriented relative to notch 16 with one side 24 placed parallel to flat 18 of notch 16, as shown (see also FIG. 8).

A broaching tool 30 is mounted in apparatus 10 and includes a profile configuration 32 having six sides 34 dimensioned and configured for the conduct of a rotary broaching operation that will create recess 20 in workpiece 12. Broaching tool 30 is held within a tool holder 36, and is secured within the tool holder 36 by a set screw 38. Tool holder 36, in turn, is mounted within a support assembly 40 for rotation about an axis of rotation A and for translation in directions extending along axis of rotation A, as now will be described.

Support assembly 40 includes a rear stem 42 for mounting the support assembly 40 for movement along axis of rotation A, toward and away from the workpiece 12. A rearward housing member 44 of support assembly 40 is integral with rear stem 42 and carries a plurality of linear guides 46 arrayed around axis of rotation A and extending parallel to axis of rotation A. A forward housing member 50 of support assembly 40 includes a plurality of guide bushings 52 located for sliding engagement with corresponding linear guides 46 to facilitate translation of forward housing member 50 relative to rearward housing member 44, in directions extending along axis of rotation A. Guide springs 54 bias the forward housing member 50 toward the forward position illustrated in FIGS. 1 and 2.

Figure 3:
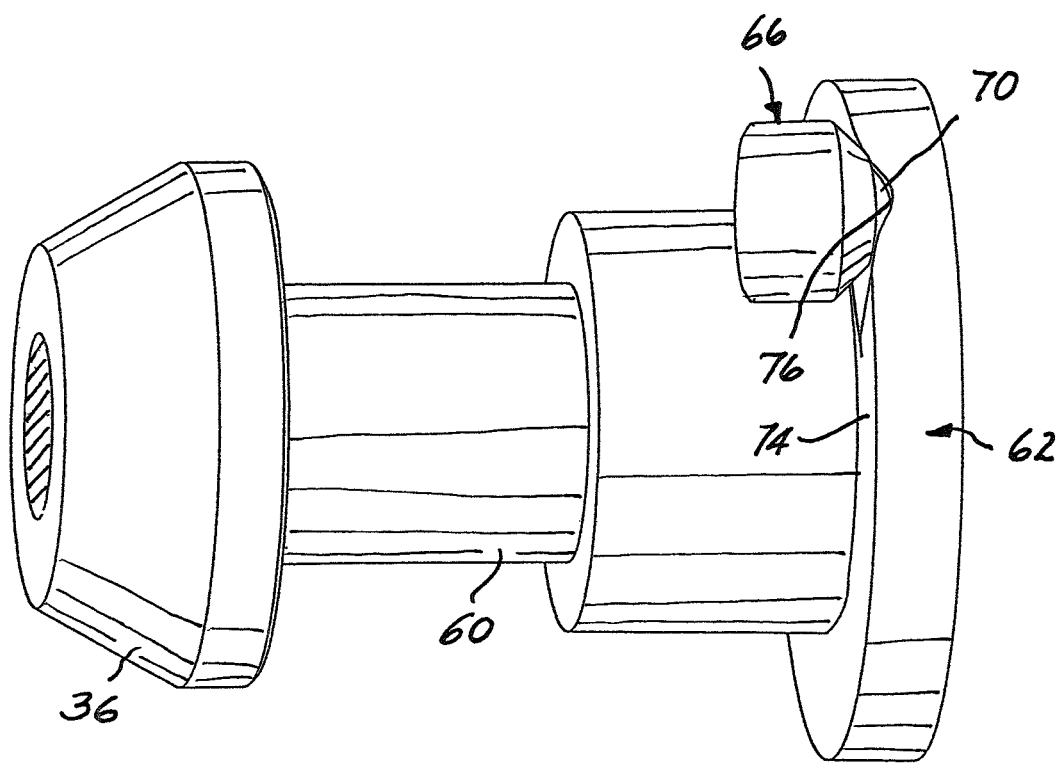
FIG. 3 is an enlarged, somewhat diagrammatic pictorial view illustrating certain component parts of the apparatus shown during operation of the apparatus at the step depicted in FIG. 1.

As best seen in FIG. 1, broaching tool 30 is oriented about axis of rotation A relative to workpiece 12 in the illustrated desired orientation, that is, with profile configuration 32 aligned with workpiece 12 such that one side 34 of profile configuration 32 is parallel with the flat 18 of notch 16 on workpiece 12. With reference to FIGS. 2 and 3, tool holder 36 includes a rearwardly extending shaft 60, and an orienting construct, comprised of an orienting member shown in the form of a cam 62, affixed to the shaft 60 by means of a connecting screw 64. With forward housing member 50 in the illustrated axially forward position, broaching tool 30 is retained in the aforesaid desired orientation by virtue of the engagement of the cam 62 with a reference construct, comprised of a reference member shown in the form of a cam follower 66, affixed to the rearward housing member 44 by means of a threaded stud 68. Cam follower 66 preferably is constructed in the form of a bearing ball 70 captured for rotation within a complementary socket 72, and cam 62 preferably includes a rear, contoured radial face 74 extending outwardly from axis of rotation A and a depression 76 for registration with and engagement by bearing ball 70, for purposes to be set forth in greater detail below. A biasing member, shown in the form of a rear spring 80, exerts a biasing force F against a thrust plate 82 which transmits force F, through a thrust bearing 84, to the cam 62 to bias the contoured radial face 74 of the cam 62 into engagement with cam follower 66. With depression 76 registered with and engaged by bearing ball 70 of cam follower 66, broaching tool 30 is located and maintained in the desired orientation relative to workpiece 12.

Figure 4:
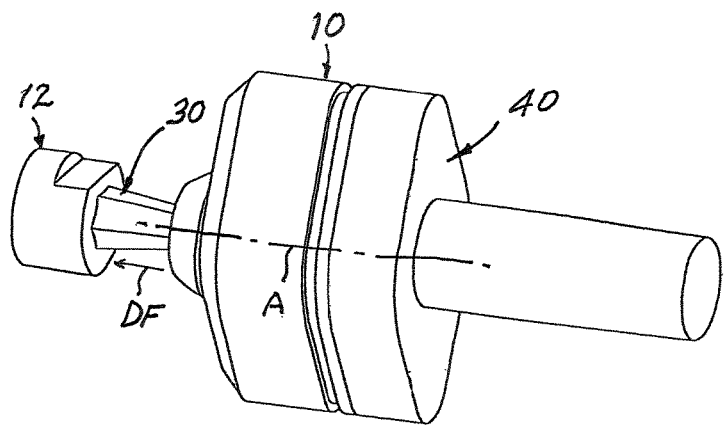
FIG. 4 is a somewhat diagrammatic pictorial view similar to FIG. 1 and showing another step in the rotary broaching operation.
Figure 5:
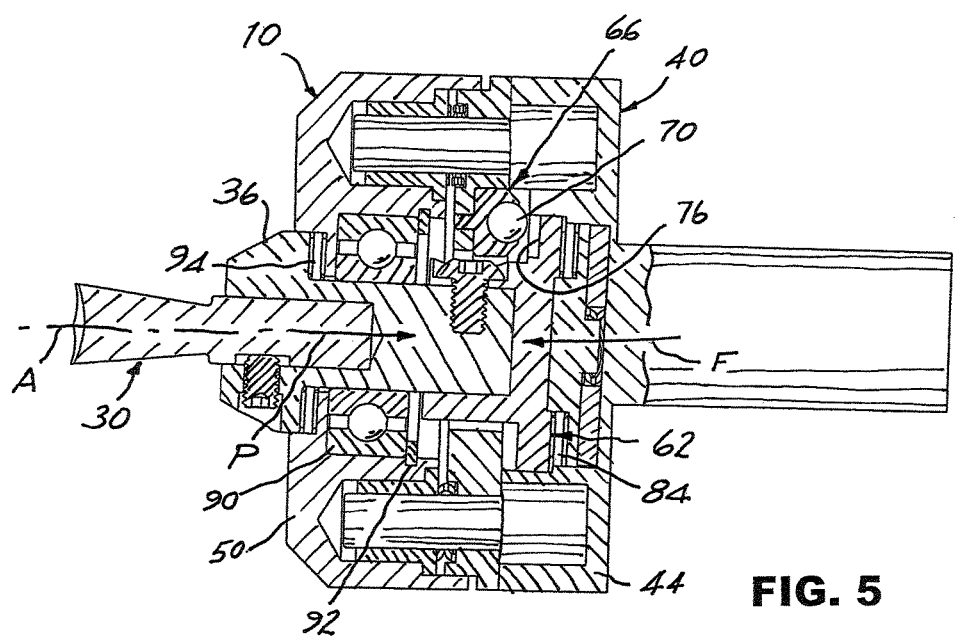
FIG. 5 is an enlarged longitudinal cross-sectional view of the apparatus as shown in FIG. 4.
Figure 6:
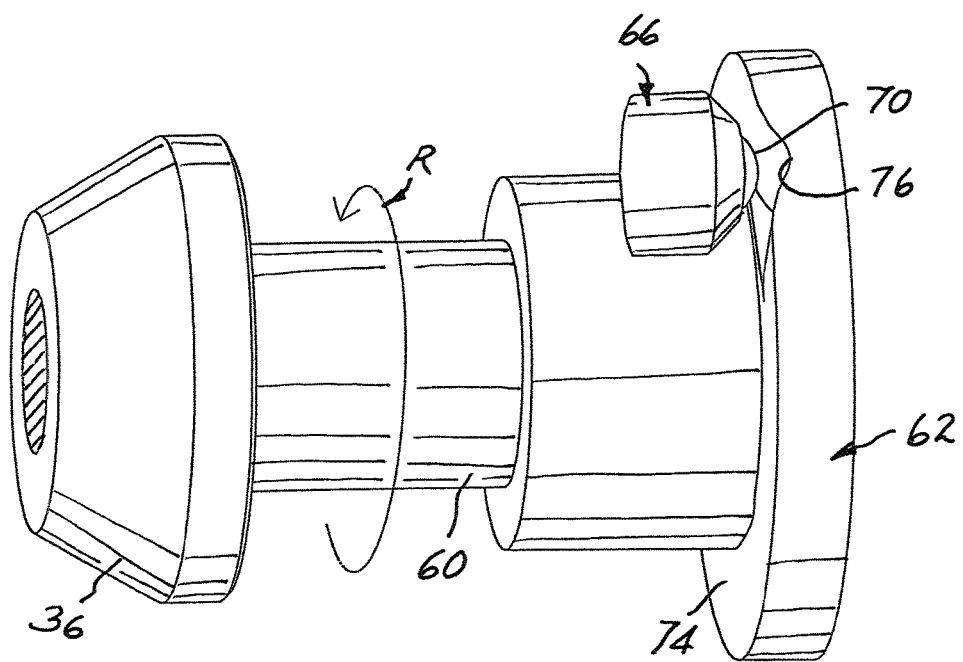
FIG. 6 is an enlarged, somewhat diagrammatic pictorial view similar to FIG. 3 and showing the certain component parts of the apparatus during the step illustrated in FIG. 4.
Figure 7:
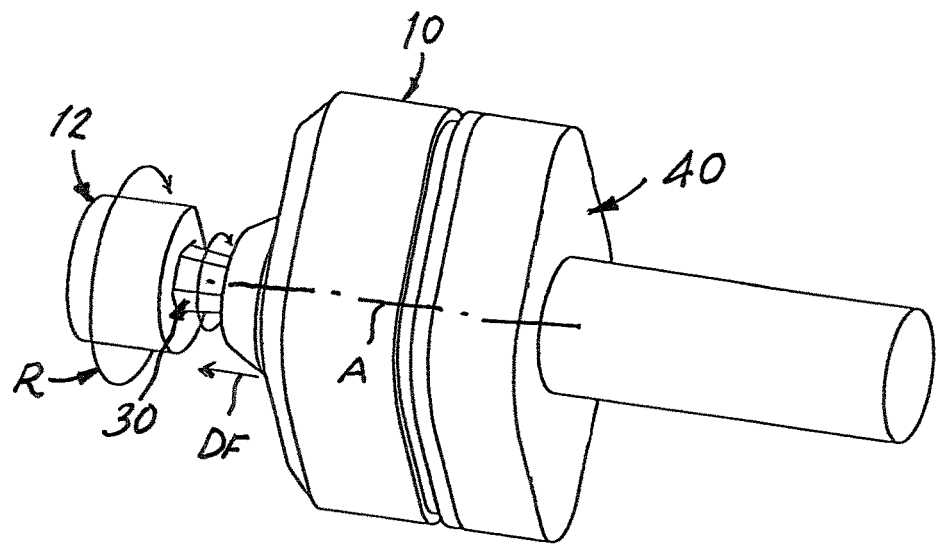
FIG. 7 is a somewhat diagrammatic pictorial view similar to FIG. 4 and showing a further step in the rotary broaching operation.

Turning now to FIGS. 4 through 7, with the broaching tool 30 oriented in the desired orientation relative to the workpiece 12, as described immediately above, support assembly 40 is advanced along a direction DF, parallel to axis of rotation A, to bring broaching tool 30 into engagement with workpiece 12, as seen in FIG. 4. Continued controlled advancement of support assembly 40 along direction DF will exert a pressure force P on tool holder 36, thus overcoming biasing force F and moving forward housing member 50 to an axially rearward position, relative to rearward housing member 44, thereby displacing tool holder 36 rearwardly relative to rearward housing member 44, as seen in FIG. 5. Such rearward displacement of tool holder 36 moves cam 62 away from cam follower 66, thus disengaging depression 76 from bearing ball 70, as seen in FIGS. 5 and 6, and freeing tool holder 36 for rotation about axis of rotation A, relative to support assembly 40, by virtue of the engagement of broaching tool 30 with workpiece 12, which, as seen in FIG. 7, is rotated in the direction R to effect rotational broaching of recess 20 in workpiece 12. To facilitate rotation of tool holder 36 relative to forward housing member 50 of support assembly 40, about axis of rotation A, tool holder 36 is mounted for rotation within forward housing member 50 by a ball bearing 90 retained within forward housing member 50 by a retaining ring 92. Such rotation of tool holder 36 relative to support assembly 40 is facilitated by thrust bearings 94 and 84.

Figure 8:
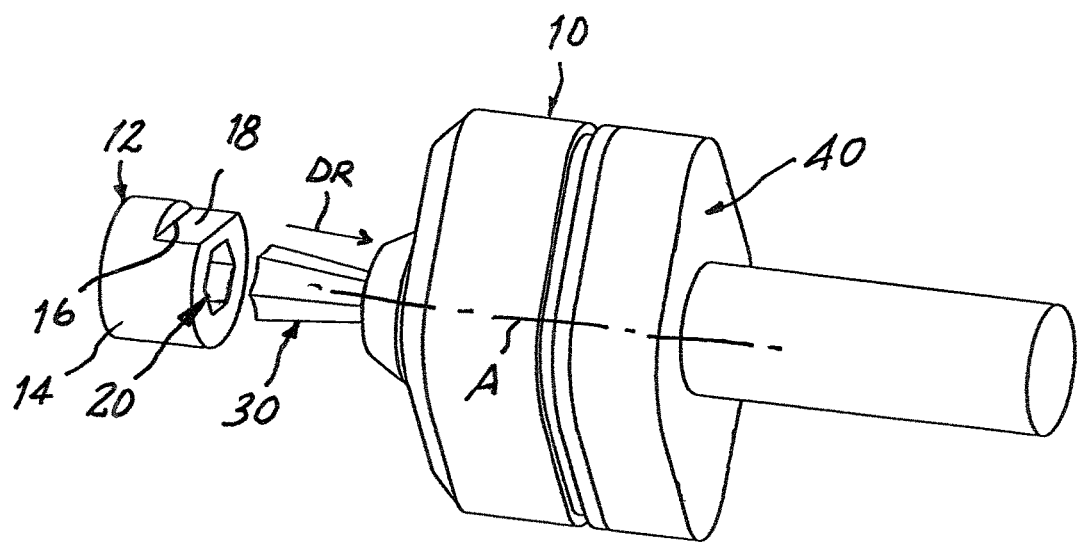
FIG. 8 is a somewhat diagrammatic pictorial view similar to FIG. 7 and showing a still further step in the rotary broaching operation.

Upon completion of the rotational broaching operation, support assembly 40 is retracted, along direction DR, to withdraw broaching tool 30 from workpiece 12, as seen in FIG. 8, relieving pressure force P. With further reference to FIG. 2, biasing force F, provided by rear spring 80, then will move tool holder 30 axially forward, relative to support assembly 40, and will engage cam 62 with follower 66, with bearing ball 70 biased against contoured radial face 74 of cam 62. Cam 62, and tool holder 36, then will rotate, in response to biasing force F applied to contoured radial face 74 of cam 62, and facilitated by ball bearing 90 and thrust bearings 84 and 94, until depression 76 once again is registered with follower 66, thereby returning broaching tool 30 to the original, desired orientation, where broaching tool 30 is retained by the engagement of bearing ball 70 of follower 66 with depression 76 of cam 62, in preparation for conducting a repeat, duplicate broaching operation on a subsequently presented next-consecutive workpiece 12. In this manner broaching tool 30 automatically is returned to the original, desired orientation for each subsequent rotary broaching operation to be performed on consecutively delivered workpieces 12, thereby eliminating the need for the conduct of further machining operations on the workpieces 12 to attain the desired orientation of recess 20 relative to flat 18 of notch 16 in a completed part 14, and realizing increased ease and economy of manufacture.

It will be apparent that the present invention attains all of the objects and advantages summarized above, namely: Enables the conduct of repetitive rotary broaching operations on serially presented workpieces where a broached configuration is to be oriented at a desired orientation relative to a particular structural feature of each serially presented workpiece; eliminates the requirement for secondary machining operations in order to assure a desired orientation of a broached configuration relative to a structural feature of a workpiece in repetitive rotary broaching operations conducted on serially presented workpieces; assures accuracy in the conduct of repetitive duplicate rotary broaching operations on serially presented workpieces; facilitates the production of completed parts in which a broached feature is created by rotary broaching conducted on each one of serially presented workpieces, with the broached feature oriented in a desired orientation relative to an existing structural feature of the serially presented workpieces; enables reliable, repetitive rotary broaching operations for increased economy in the production of completed parts of consistent high quality; provides apparatus and method capable of effective performance in the conduct of rotary broaching throughout an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. Apparatus for holding a broaching tool during the conduct of repetitive duplicate rotary broaching operations on serially presented workpieces wherein the broaching tool is engaged serially with each workpiece for rotation with an engaged workpiece during a corresponding rotary broaching operation, each workpiece having a given configuration and the broaching tool having a configuration placed at an initial orientation for establishing a broached configuration placed at a same predetermined orientation relative to the given configuration of each workpiece, the apparatus being constructed such that upon completion of the corresponding rotary broaching operation on the engaged workpiece, the broaching tool is returned to the initial orientation in preparation for a duplicate rotary broaching operation on a subsequent serially presented workpiece, the apparatus comprising:

a support assembly;

a tool holder mounted upon the support assembly for rotation relative to the support assembly about an axis of rotation, and for translation along the axis of rotation between a first axial position and a second axial position relative to the support assembly;

a reference construct carried by the support assembly at a fixed position corresponding to the initial orientation of the broaching tool;

an orienting construct coupled with the tool holder for rotation with the tool holder in response to engagement with the reference construct;

a biasing member for biasing the orienting construct and the reference construct into engagement with one another, with a biasing force for biasing the orienting construct and the tool holder into a broaching position corresponding to the initial orientation of the broaching tool, such that upon engagement of the broaching tool held within the tool holder with the engaged workpiece and movement of the tool holder from the first axial position to the second axial position, against the biasing force, the tool holder, and the broaching tool held therein, will be free to rotate about the axis of rotation, in response to rotation of the engaged workpiece, and upon disengagement of the broaching tool from the engaged workpiece, the tool holder will be moved, in response to the biasing force, from the second axial position to the first axial position, whereby the orienting construct and the reference construct will be engaged with one another to return the tool holder and the broaching tool to the broaching position in preparation for the duplicate rotary broaching operation on the subsequent serially presented workpiece.

2. The apparatus of claim 1 wherein:

the orienting construct includes a cam coupled with the tool holder for rotating with the tool holder in response to engagement with the reference construct; and the reference construct includes a follower affixed to the support assembly in position to be engaged by the cam when the tool holder is moved into the first axial position.

3. The apparatus of claim 2 wherein the cam includes a depression located for receiving the follower when the tool holder is in the first axial position.

4. The apparatus of claim 3 wherein the follower includes a bearing ball captured for rotation within a socket.

5. The apparatus of claim 3 wherein the biasing member includes a spring for biasing the orienting construct and the reference construct into engagement with one another to establish the biasing force for biasing the orienting construct and the tool holder into the broaching position.

6. The apparatus of claim 2 wherein the cam includes a contoured face extending radially outwardly from the axis of rotation, the contoured face being juxtaposed with the follower for engagement by the follower in response to movement of the tool holder from the second axial position to the first axial position.

7. The apparatus of claim 6 wherein the cam includes a depression located for receiving the follower when the tool holder is in the first axial position.

8. The apparatus of claim 7 wherein the follower includes a bearing ball captured for rotation within a socket.

9. The apparatus of claim 7 wherein the biasing member includes a spring for biasing the orienting construct and the reference construct into engagement with one another to establish the biasing force for biasing the orienting construct and the tool holder into the broaching position.

10. The apparatus of claim 1 wherein the biasing member includes a spring for biasing the orienting construct and the reference construct into engagement with one another to establish the biasing force for biasing the orienting construct and the tool holder into the broaching position.

* * * * *